United States Patent [19]

Zucker

[11] 4,101,535

[45] Jul. 18, 1978

[54] METHOD AND APPARATUS FOR RECOVERING SAPONIFIED TALL OIL

[75] Inventor: Jerry Zucker, Lake Como, Fla.

[73] Assignee: Hudson Pulp & Paper Corp., New York, N.Y.

[21] Appl. No.: 672,836

[22] Filed: Apr. 1, 1976

[51] Int. Cl.² ............................................... C09F 1/00
[52] U.S. Cl. ................................... 260/97.7; 210/259; 260/97.5
[58] Field of Search .............................. 260/97.5, 97.7

[56] References Cited

U.S. PATENT DOCUMENTS

| | | | |
|---|---|---|---|
| 1,736,802 | 11/1929 | Schultze | 260/97.5 |
| 1,986,817 | 1/1935 | Hasselstrom | 260/97.5 |
| 2,200,468 | 5/1940 | Cirves | 260/97.7 |
| 2,518,917 | 8/1950 | Mattil | 260/103 |
| 3,404,063 | 10/1968 | Harding | 162/16 |
| 3,449,313 | 6/1969 | Bolger et al. | 260/97.5 |

*Primary Examiner*—Melvyn I. Marquis
*Attorney, Agent, or Firm*—Harold L. Stults; Pasquale A. Razzano

[57] ABSTRACT

A method and apparatus for separating saponified tall oil or soap from black liquor which has been stored in an open pond. During such storage, the tall oil saponifies into soap, and the soap separates somewhat and a portion of it settles with the lignin to the bottom of the pond. A submerged propeller is operated by an internal combustion engine on a boat and directs a liquid and gas stream into the layer of liquid soap "sludge" so that the soap is whipped and dispersed. The whipping action causes the soap particles to agglomerage so as to form larger soap portions. The propeller also produces small bubbles of air which become attached to the soap portions thus aiding them in floating to the pond surface. The soap forms in a layer and is pushed along the liquid surface into a discharge tank from which it is pumped to a tank truck. The soap is then hauled to a plant where it is processed.

8 Claims, 4 Drawing Figures

METHOD AND APPARATUS FOR RECOVERING SAPONIFIED TALL OIL

This invention relates to the recovery of "soap" from black liquor. As used herein, the term "soap" means saponified tall oil. Tall oil is a by-product from the kraft process of producing wood pulp, and appears in the black liquor which is discharged from the digester. In accordance with the preferred present practice, such pulp mills include facilities for utilizing the black liquor, e.g., removing the tall oil and processing it. When such facilities are out of service or are inadequate, the black liquor may be stored in an open pond and then returned for use at a later time. However, when black liquor is stored for a substantial period of time in an open storage pond, a natural process of surface acidulation takes place which precipitates some lignin which in turn carries a substantial portion of soap residual. Lignin is heavier than the liquor, and the attached soap and lignin tend to settle to the bottom of the pond. Hence, the pond develops a substantial "sludge" layer of soap and lignin along its bottom surface. It is the object of the present invention to recover the available soap from both the sludge layer and liquor and to return it to treating facilities where it is acidulated and reconverted to the tall oil constituents.

In the drawings which are schematic representations of one embodiment of the invention:

FIG. 4 is an enlarged vertical section on the line 4—4 of FIG. 1, showing the floating barrier strip.

Figure 1:
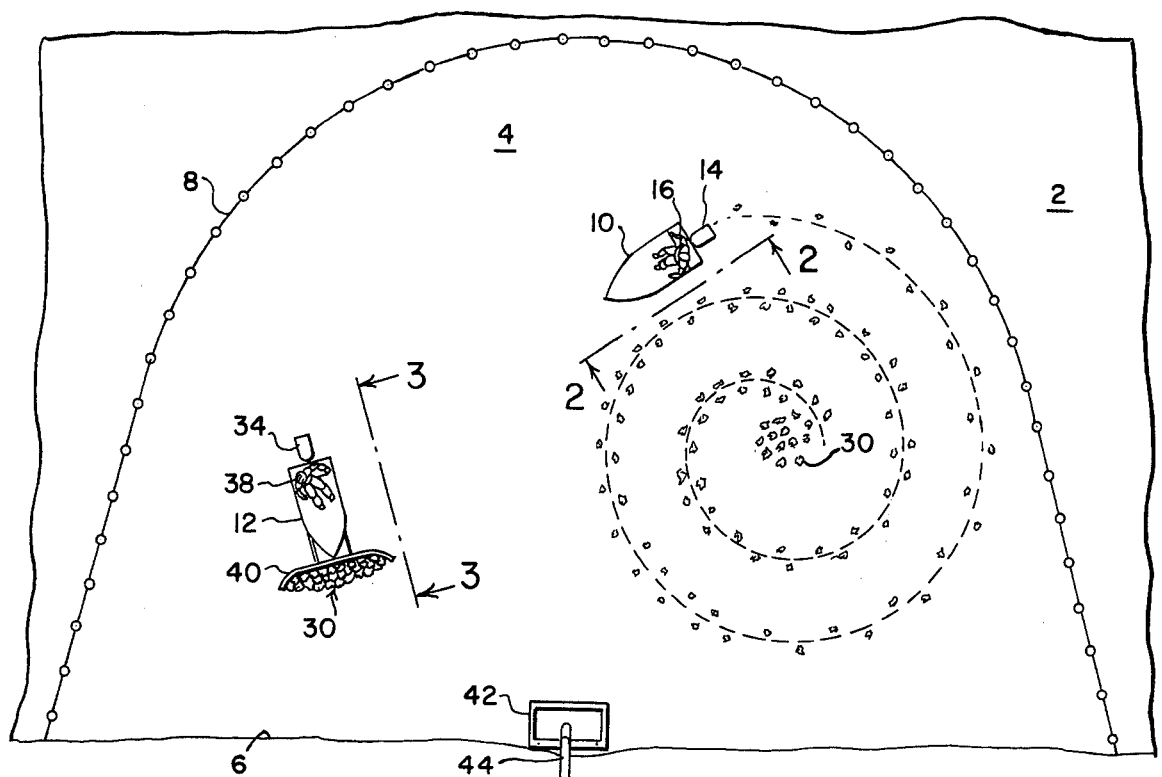
FIG. 1 is a top plan view of the system.

Referring to FIG. 1 of the drawings, an open pond 2 of black liquor has an area 4 which is enclosed by a portion 6 of the shore line and a floating vertical barrier strip 8 which extends along the liquid surface. Positioned within area 4 are two motor boats 10 and 12, each of which is occupied and operated by a person.

Barrier strip 8 is a plastic sheet (see FIG. 4) of the order of 14 inches in width and of sufficient thickness to support itself. Attached along the longitudinal center line of one surface of the strip are floats 23 which support the barrier strip in the vertical position shown with its longitudinal center line at approximately the pond surface 22.

Figure 2:
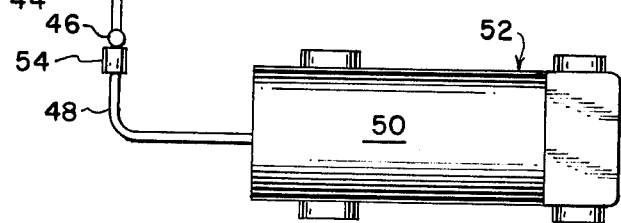
FIG. 2 is a vertical section on the line 2—2 of FIG. 1.
Figure 2:
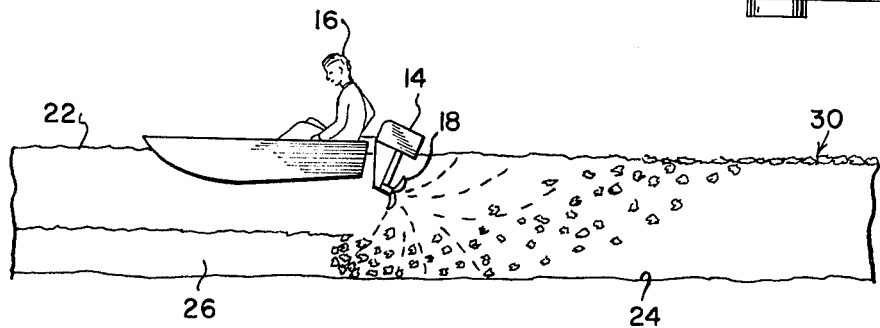

Referring to FIG. 2, boat 10 has a motor 14 and an operator 16, and motor 14 has a driving propeller 18 positioned in the usual manner adjacent the liquid surface 22.

The bottom surface 24 of the pond is formed by a plastic sheet which restrains leakage of the liquor from the pond. Directly above surface 24 is a layer 26 of soaplignum sludge. The action of propeller 18 is to disburb layer 26 and cause it to be circulated through the propeller. That produces a beating or whipping action on the soap and causes it to agglomerate, thus forming relatively large globules or portions of the soap. The whipping action also separates the lignin from the soap, and the lignum tends to settle on the bottom pond surface 25. The process also agglomerates and removes residual soap contained in the liquor phase as well.

Boat 10 moves continuously in a circular path or a spiral path of progressively increasing radius. The violent whipping action of propeller 18 also produces cavitation with the entry of air into the steam of liquid, and the formation of small bubbles which tend to adhere to the soap particles. The soap has a specific gravity less than that of the liquid so that it tends to float to the top surface 22 of the pond. The air bubbles adhering to the soap particles facilitate that action, and the soap accumulates in a layer 30 on top surface 22.

Figure 3:
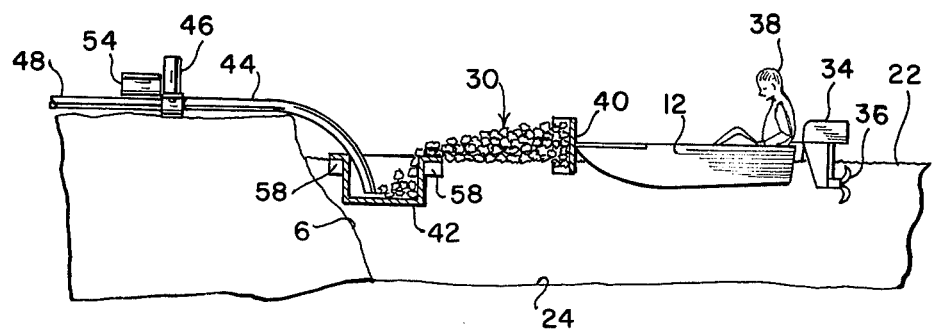
FIG. 3 is a vertical section representing the operation of the boat shown at the line 3—3 of FIG. 1.

When layer 26 is of the thickness illustrated, a single pass of boat 10 may not be sufficient to disperse in the entire layer and complete the whipping of the soap. In such case, the path of boat 10 is a relatively tight spiral so that the soap in each area of layer 26 is whipped more than once. The whipping of soap particles or portions does not have an adverse effect. The soap which tends to adhere to the propeller is thrown off by centrifugal forces, thus promoting the formation of larger soap portions. A barrier strip 8 and the shore line 6 (see FIG. 1) confine the soap layer 30 to area 4. The soap layer 30 appears as a thick scum and tends to contain air bubbles and some particles of entrained liquid. Referring now to FIG. 3, boat 12 has an outboard motor 34 with a propeller 36, and is controlled and operated by a person 38. Mounted upon and ahead of the bow of the boat is a pusher plate 40 which is arcuate in a horizontal plane and extends transversely to the center line of the boat. Pusher plate 40 extends vertically from below the normal liquid surface to above the maximum height of the layer of foam. Boat 12 is utilized to push the layer of soap along a path directly toward an open-top collector tank 42 adjacent the shore line. The top of tank 42 is slightly above the level of liquid surface 22, so that liquid does not flow into the tank, but the soap is above the liquid surface. Hence, as boat 12 approaches tank 42, the soap piles ahead of pusher plate 40 and spills over the top edge of tank 42 into the tank.

Extending into tank 42 from a pump 46 on the land is a large hose 44 which has its open end adjacent the bottom of the tank. A hose 48 extends from pump 46 to the tank 50 of a tank truck 52. Pump 46 is operated by an internal combustion engine 54, and pumps soap foam from collector tank 44 into the truck tank 50. Tank truck 50 then hauls the soap to a storage tank, from which it is supplied a processing system.

Referring again to FIG. 2, when layer 26 has been in effect destroyed throughout area 4, and after the operation of boat 10 is discontinued, soap continues to rise to form the soap layer. The operation of boat 12 is continued until all of the soap has risen and layer 30 has been delivered to tank 42. Tank 42 which is supported on the surface of the liquid by a float 58, and barrier strip 8 may be moved to another location along the shore of the pond. Also, the invention contemplates that tank 42 and barrier strip 8 can be located and anchored remote from the shore line when that is desirable. Barrier strip 8 is of sufficient length to permit it to be used to enclose an area away from the shore of satisfactory size, and the entire bottom surface of the pond can thus be treated to remove the soap.

It is understood that the whipping or beating performed by propeller 10 can be performed by other beating mechanisms. Also, the gathering of the layer 30 is a special skimming operating wherein the soap is pushed along the liquid surface over the top edge of a wall of tank 42. It is important that this top edge be high enough to prevent the liquid from flowing into the tank. That is, for this mode of operation said top edge of tank 42 must be at a higher elevation than the top surface of the liquid.

The invention is adaptable to various conditions of operation and use within the scope of the claims. Other systems may be used for performing the beating or whipping operations and for performing the separation of the soap from the liquor.

What is claimed is:

1. The method of removing tall oil soap from black liquor in a storage pond, which method comprises, the steps of, storing the liquor with its surface exposed to the atmosphere for a sufficient period of time to permit particles of soap and lignin in said black liquor to accumulate in a layer at the bottom of the pond, creating a whipping action in the black liquor and disturbing said layer on the bottom of the pond with said whipping action to cause the particles of soap in said layer to agglomerate and release said lignin and also to agglomerate residual soap contained within the liquor above said layer, whereby the differences in specific gravity causes the agglomerated soap to float toward the top of the body of liquor in the pond, and thereafter skimming the agglomerated soap from the surface of the black liquor in the pond.

2. The method as described in claim 1 wherein said step of whipping introduces air into the liquor and produces small air bubbles which adhere to the soap portions and aid in floating the soap portions to the top surface of the liquor.

3. The method as described in claim 1 wherein the soap accumulates in the form of scum on the top surface of the liquor and wherein said skimming step is performed by exerting a continuous pushing action parallel to said top surface of the liquor and in the plane thereof, and pushing the soap thereby collected over a barrier edge above said top surface into a discharge cavity, and pumping the soap from said cavity to transportation means.

4. The method as described in claim 1 which includes floating cavity means on said top surface of the liquor.

5. The method as described in claim 4 which includes the step of confining the movement of the soap collected on said top surface to a specific area.

6. The method as described in claim 1 wherein said whipping is produced by a rotating propeller and the action is carried on along a continuous path having a circular or spiral configuration.

7. The method as described in claim 1 wherein the whipping action is accompanied by the introduction of air formed into small bubbles which aid in urging the agglomerated soap to move upwardly in the body of liquor.

8. The method as described in claim 7, wherein said rotating propeller is positioned adjacent the surface of the layer of black liquor in the pond and is directed towards said layer on the bottom of the pond.

* * * * *